Aug. 15, 1950  P. OSTERGAARD  2,519,150
METHOD AND APPARATUS FOR STRIPPING FLUIDIZED SOLIDS
Filed April 25, 1946  3 Sheets-Sheet 1

Inventor
POVL OSTERGAARD
By G. M. Houghton
his Attorney

Aug. 15, 1950     P. OSTERGAARD     2,519,150
METHOD AND APPARATUS FOR STRIPPING FLUIDIZED SOLIDS
Filed April 25, 1946     3 Sheets-Sheet 2
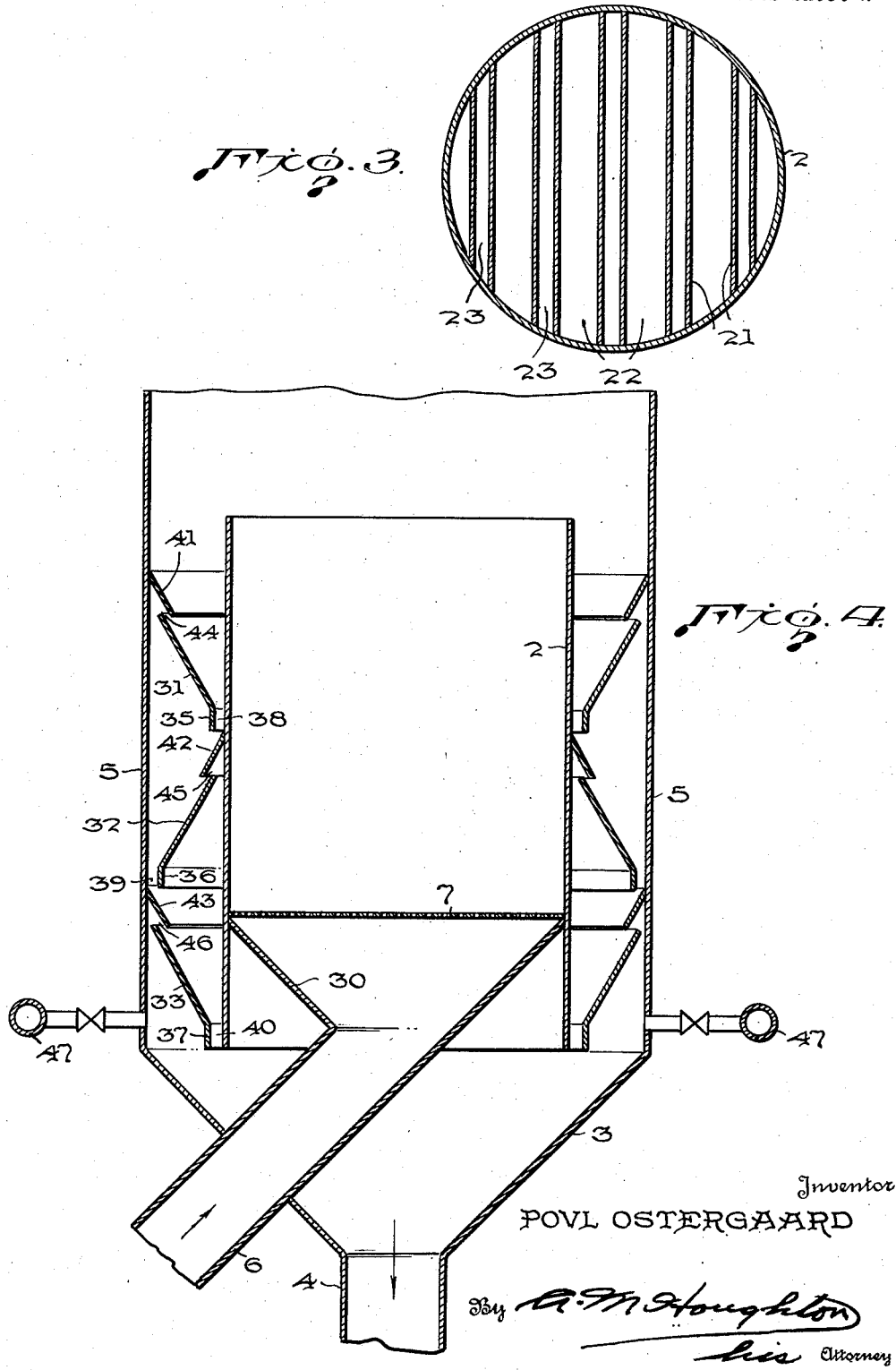
Inventor
POVL OSTERGAARD Inventor
POVL OSTERGAARD Patented Aug. 15, 1950

2,519,150

UNITED STATES PATENT OFFICE 2,519,150

METHOD AND APPARATUS FOR STRIPPING FLUIDIZED SOLIDS

Povl Ostergaard, Mount Lebanon, Pa., assignor to Gulf Oil Corporation, Pittsburgh, Pa., a corporation of Pennsylvania Application April 25, 1946, Serial No. 664,743

9 Claims. (Cl. 196—52)

This invention relates to a method and apparatus for stripping fluidized solids. More particularly, this invention is concerned with a method and apparatus for stripping entrained hydrocarbon vapors from a fluidized solid catalyst or adsorbent by means of an inert gaseous stripping medium.

The technique of using finely divided solids in fluidized form in catalytic conversion processess such as catalytic cracking, reforming, hydroforming, chemical synthesis and the like has recently received considerable attention in the art. In such processes, the reactant vapors or other gaseous vehicle contain the finely divided solid catalyst suspended therein, so that a suspension which is capable of flowing like a liquid is employed. The suspension is usually passed upwardly in a stream into a reactor where the conversion takes place. When the stream passes upwardly in the reactor, its velocity is such that the small solid particles of catalyst slip downwards against the rising vapors. The conditions of temperature, pressure and concentration, i. e., conversion conditions, existing in the reactor cause the conversion of the reactant vapors, in the presence of the catalyst, into products of different character from those charged. Upon reaching the top of the moving bed of fluid catalyst, the conversion products disengage themselves from the catalyst and pass from the reactor for further processing. In the course of the conversion, the catalyst particles lose their activity and become at least partially deactivated or spent by reason of the deposition thereon of carbon or a coky material or other poisons or contaminants. The spent catalyst is continuously withdrawn from the bottom of the reactor, and, in order to permit restoration of the catalyst to its original activity, it is regenerated by oxidation of the contaminant with air or other material. The catalyst may then be reused in the process.

A major problem in the conversion processes described above, specifically in the fluid catalytic cracking process for petroleum fractions, is the removal of entrained hydrocarbon vapors from the deactivated catalyst withdrawn from the reactor, prior to regeneration of the catalyst. If any hydrocarbon vapors are left in the catalyst entering the regenerator, an additional combustion load will be imposed on the regenerator thereby limiting its capacity for the oxidation of the actual contaminants on the catalyst. Furthermore, the burning of entrained hydrocarbon vapors in the regenerator represents a loss in yield of final converted product.

To meet this problem, the art has recognized that the spent catalyst leaving the reactor should be stripped as completely as possible of entrained reactant and product vapors. To this end the spent catalyst leaving the reactor is contacted with an inert gaseous stripping medium such as steam, nitrogen, carbon dioxide, combustion gases or the like. However, the known types of stripping units do not effect a satisfactory and efficient removal of these entrained vapors. In some instances, the inefficiency is due in part to an incomplete mixing of the stripping medium and the catalyst. This results from the setting up of eddy currents in the stripping zone which permits stripping medium to pass up one side, and catalyst stream and entrained reactant and product vapors to pass down the other side. But even if thorough mixing is accomplished, the amount of stripping medium required to remove all entrained vapors in the known processes is in excess of that theoretically necessary, due to recycling within the stripper; and, in practice, it has been found that a point is reached beyond which an increase in the amount of stripping medium lowers rather than raises the efficiency. Therefore, for example, in a typical fluid catalytic cracking operation wherein the weight ratio of catalyst circulation to feed charge is approximately 15 to 1, the present types of stripping processes in operation result in the burning in the regenerator of entrained hydrocarbon vapors amounting to from 2 to 4 per cent by weight on the charge. Since the carbon deposited on the catalyst is on the order of from 3 to 6 per cent by weight on the charge, it may readily be seen that a great percentage of the regenerator capacity is taken up in burning entrained hydrocarbon vapors. An amount of entrained hydrocarbon vapors approximating 2 per cent by weight on the charge corresponds to approximately 40 per cent by volume of the total vapors in the entrained gas. This amount of hydrocarbon vapor carried over to the regenerator will reduce the burning capacity of the regenerator for actual carbon deposited on the catalyst by one-fourth to one-third. If these entrained vapors could be reduced in quantity or completely removed, a gain in regenerator capacity of hydrocarbon conversion units could be obtained. This would then make possible either a higher rate of charge to the reactor at the same conversion, or an increase in the conversion at the same charging rate. In addition, the yield of liquid products would be increased by an amount substantially equivalent to the amount of hydrocarbon vapors stripped from the catalyst.

Accordingly, it is a prime object of this invention to effect, in a catalytic conversion process, the stripping of substantially all reactant and product vapors entrained in the spent fluidized catalyst withdrawn from the reactor, prior to regeneration of the catalyst.

It is a further object of this invention to provide simple and effective apparatus which will accomplish the stripping of substantially all entrained reactant and product vapors from the spent catalyst.

It is a further object of this invention to effect a gain in regenerator capacity, thereby permitting a greater throughput or conversion and an increase in yield, for a hydrocarbon conversion unit of no greater designed capacity than the present commercial units.

It is a further object of this invention effectively to strip entrained, including adsorbed, vapors or gases from fluidized solids used as catalysts or adsorbents.

These and other objects are achieved by the present invention wherein a stream of spent fluidized solid catalyst or adsorbent commingled with entrained, including adsorbed, gases or vapors, which may be hydrocarbon vapors, is withdrawn from the reactor, passed downwardly into a stripping zone, contacted with a stream of an inert gaseous stripping medium to decrease its density, then subjected to an increase in density, again contacted with a stream of an inert gaseous stripping medium to decrease its density, and again subjected to an increase in density, the alternate decrease and increase in density being repeated in stages until the amount of entrained or adsorbed vapors has been substantially reduced below the amount entering the stripping zone. Contact of the stripping medium with the stream of fluidized catalyst or adsorbent strips off part of the entrained or adsorbed vapors and reduces the density of the stream. Subsequent increase in density of the stream of fluidized catalyst or adsorbent results in squeezing out of a further portion of the entrained or adsorbed vapors. Repetition of this process in stages results in the practically complete removal of entrained or adsorbed vapors from the stream of fluidized catalyst or adsorbent.

A preferred feature of this invention is the countercurrent contact of stripping medium and fluidized solids. The stream of fluidized catalyst or adsorbent passes downwardly from the reactor into the stripping zone and is contacted in the first stage by a mixture of stripping medium and stripped-off vapors from a succeeding stage. In the last stage of the stripping zone, the stream of fluidized solids is contacted by a stream of pure stripping medium. In the stages between the first and last stage, the stripping medium will carry an increasing amount of stripped-off vapors as it passes upwardly through the stripping zone. In this manner, contact of the freshest stripping medium with solids containing the least amount of entrained or adsorbed vapors with the advantages attendant thereto, is assured.

Another feature of this invention is the provision of a defined path for the descending stream of fluidized solids, a different defined path for the ascending stream of stripping medium and stripped-off vapors, and defined mixing zones adjacent to the points of intersection of the two streams. This results in making full use of the action of the stripping medium by accomplishing thorough mixing of the stream of fluidized solids and stripping medium at the various stages in the stripping zone and at least twice, and avoids conditions which may let stripping medium pass up through one side of the stripping zone and the stream of fluidized solids down through the other side without mixing.

Another feature of this invention is the repeated contact of the stream of fluidized solids by the stripping medium while the former is at a density substantially greater than that existing immediately after contact with the stripping medium. Since the amount of entrained or adsorbed vapors or gases displaced from the stream of fluidized solids is directly proportional to the amount of stripping medium with which it is contacted, and since a dense suspension of fluidized solids can be contacted with more stripping medium per unit volume of suspension than a less dense suspension, more entrained or adsorbed vapors will be stripped off by this procedure. Furthermore, contact of the stream of fluidized solids by the stripping medium while the former is at an increased density serves to decrease the density, so that the important step of increasing the density may be repeated.

Another feature of this invention is the repeated and alternate decreases and increases in density of the stream of fluidized solids in stages. In changing the density of such stream from a lesser density to a greater density, the amount of vapors entrained or adsorbed by a given weight of solid catalyst or adsorbent will be reduced because part of the vapors are squeezed out of the suspension of solids as the density increases. Repetition of this action in successive stages resulats in further removal of entrained or adsorbed vapors from the stream of fluidized solids. As used herein, the term "density" of the stream of fluidized solids refers to the apparent or bulk density of the stream and includes the weight of catalyst or adsorbent particles, entrained or adsorbed vapors, stripping medium and whatever other material may be present per unit volume of the stream at any point under consideration. Decreases in density are conveniently accomplished by dilution of the stream with stripping medium. Increases in density may be accomplished by constricting the passage through which the stream flows thus squeezing vapors therefrom and liberating them to the space above. However, this invention is not limited to these specific means of varying the density. Similar results may be accomplished by varying the velocity of the stream of inert gaseous stripping medium, as is known in the art.

In general, the apparatus used for carrying out the process may take the form of a shell forming a confined space in which is mounted a plurality of baffles of suitable shape. The baffles are so arranged as to form a series of alternate wide and constricted passages. Means for contacting the stream of fluidized solids with the stripping medium are disposed at or adjacent to the outlets from the constricted passages, and may advantageously take the form of perforations or openings discharging into the wide passages formed by the baffles. A conduit for introducing the stripping medium is located at the bottom of the shell, and the stripped stream of fluidized solids discharges into a standpipe from the last baffle in the bottom of the shell.

The invention will be better understood by reference to the accompanying more or less diagrammatic drawings, which are described in connection with the application of this invention to catalytic conversion of hydrocarbons.

Figure 3 is a section of the stripper of Figure 2, taken along the line 3—3.

Figures 4 and 5 are vertical sections of strippers showing still other embodiments of the invention.

Figure 1:
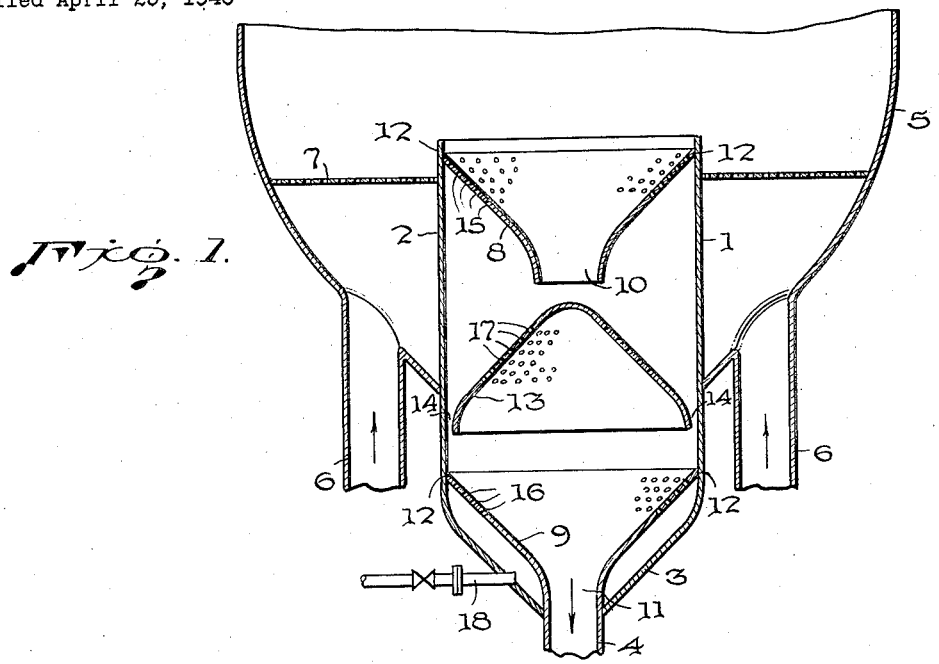
Figure 1 is a vertical section of a stripper showing a preferred embodiment of the invention.

Referring now to Figure 1, the numeral 1 represents the stripper generally. The shell 2 of the stripper is preferably cylindrical but may have any suitable shape. The shell 2 has a conical base 3 through which passes a standpipe 4. The shell 2 of the stripper is installed in the base of a reactor 5, having feed lines or conduits 6, and a distribution grid or screen 7. Within the shell 2 are disposed funnel shaped baffles 8 and 9, having narrowed throats 10 and 11, respectively, extending downward. The throat 11 of baffle 9 is joined to the standpipe 4. The upper (wide) end of the funnel shaped baffles 8 and 9 is joined to the shell 2 and makes peripheral contact therewith at 12. The baffle 9 forms a confined space with conical base 3 of the stripper. Intermediate of the baffles 8 and 9 is disposed a conical baffle 13, with the apex thereof extending upwardly and spaced in opposing relationship to the throat 10 of baffle 8. The base of the conical baffle 13 extends downwardly and is spaced in opposing relationship to the upper (wide) end of funnel shaped baffle 9. The lower part of the conical baffle 13 does not contact the shell 2, but is so disposed with respect to the shell as to form a narrow annular space 14 between the shell and the baffle. In the upper part of the funnel shaped baffles 8 and 9 and in the upper part of the conical baffle 13 are rows of perforations or openings 15, 16 and 17, respectively, which are preferably horizontal or substantially horizontal. A pipe or nozzle 18 opens into the base 3 of the stripper for the purpose of admitting the stripping medium.

In operation, the hydrocarbons to be converted together with a finely divided solid catalyst in suspension therein enter the reactor 5 through feed lines 6 and pass upwardly in the reactor through the distribution grid 7. The conversion takes place in the reactor above the stripper and the conversion products pass upwardly out of the reactor into further processing apparatus which is not shown. A stream of spent catalyst commingled with entrained hydrocarbon vapors and having a density of approximately 15 pounds per cubic foot passes downwardly from the reactor into the top of baffle 8. Steam or other inert gaseous stripping medium is introduced into the bottom of the stripper through pipe or nozzle 18 and passes upwardly through the perforations 16 in baffle 9. As the stream of spent catalyst enters the baffle 8 it is mixed with steam and stripped off hydrocarbon vapors flowing through the perforations 15 from the succeeding stage. The catalyst stream is thoroughly mixed with the stripping medium and thereby lowered in density. Stripped-off hydrocarbon vapors together with stripping medium pass upwardly into the reactor 5. The catalyst particles settle down into the narrow throat 10 of baffle 8, and the catalyst stream is thereby increased in density because of the increasing constriction of the passage, thus squeezing out the entrained vapors which are liberated to the space above and which will flow upward due to their lighter density. Upon passing through the throat 10, the density of the catalyst stream has been increased to about 25 pounds per cubic foot. The amount of hydrocarbon vapors carried with a given weight of catalyst through the throat 10 has now been considerably reduced from the amount carried with the same weight of catalyst entering the baffle 8. This is due to (1) the displacement of part of the entrained hydrocarbon vapors by the stripping steam, and (2) the increase in density of the catalyst stream to 25 pounds per cubic foot which results in squeezing out a further portion of the entrained hydrocarbon vapors from the catalyst stream.

The stripped-off hydrocarbon vapors pass upwardly into the reactor 5 and the catalyst stream, now at a density of about 25 pounds per cubic foot passes from throat 10 and is deflected by the top of conical baffle 13 over the perforations 17 therein. As the catalyst stream passes over the perforations 17, it is immediately aerated or further fluidized by contact with a stream of stripping steam mixed with stripped-off hydrocarbon vapors flowing through the perforations from the succeeding stage. Contact of the dense catalyst stream with the stripping medium serves to displace a still greater portion of the entrained hydrocarbons and also serves to reduce the density of the catalyst suspension to approximately 15 pounds per cubic foot. From the space formed by the baffles 8 and 13 and the shell 2, the heavier catalyst particles settle down into the narrow annular space 14 and by so doing the density of the catalyst suspension is again increased to approximately 25 pounds per cubic foot. In this stage more entrained hydrocarbon vapors have been stripped off from the catalyst stream because of (1) displacement of the vapors by the stripping steam entering from the perforations 17 in baffle 13, and (2) squeezing out of the vapors by reason of the increase in density in the annular space 14. The stripped-off hydrocarbon vapors commingled with stripping steam pass upwardly in the stripper and through the perforations 15 in baffle 8 where the mixture is used to contact the catalyst stream entering the stripper.

The catalyst stream at an increased density of approximately 25 pounds per cubic foot passes from annular space 14 over the perforations 16 in baffle 9 and is immediately contacted and further fluidized with a stream of pure steam flowing through the perforations. Again, a further portion of the entrained hydrocarbon vapors are displaced, and the density of the catalyst stream is reduced to approximately 15 pounds per cubic foot. From the space formed between the baffles 9 and 13, the heavier catalyst particles settle down into the narrow throat 11 of baffle 9 and in so doing are increased in density to approximately 25 pounds per cubic foot, whereby a further portion of entrained hydrocarbon vapors are squeezed out. It may be seen that the amount of entrained hydrocarbon vapors has been further reduced for the same reasons as in the preceding stages. The stripped-off hydrocarbon vapors commingled with stripping steam pass upwardly and through the perforations 17 in baffle 13 where the mixture is used to contact the catalyst stream flowing over the perforations 17 from throat 10.

The catalyst stream in throat 11 of baffle 9 is now substantially free of entrained hydrocarbon vapors and passes into standpipe 4 whence it flows to the regenerator (not shown) for reactivation. Some steam is admitted to the standpipe in order to keep the catalyst fluidized.

As may be seen from the above description, the catalyst stream flows in a defined path through throat 10, annular space 14, and throat 11. The stripping medium flows in a different defined path through the perforations in baffles 9, 13 and 8, successively, and countercurrent to the catalyst stream. Thorough mixing of the catalyst stream and the stripping medium is achieved in the upper portion of baffle 8 and in the zones between the baffles 8 and 13 and the baffles 13 and 9, respectively. The density of the catalyst stream is alternately and repeatedly decreased and increased. Decreases in density take place in the above defined mixing zones, and increases in density take place in the throat 10, annular space 14, and throat 11. Contact with the stripping medium takes place while the catalyst stream is at an increased density. The stripping action takes place in well-defined stages, contact with stripping medium and subsequent increase in density being considered a single stage.

Although Figure 1 shows three stripping stages, the invention is not limited thereto but as many stages may be added as is desired. Additional stages will result in a greater amount of hydrocarbon vapors being stripped off for a given amount of stripping medium, or, will require less stripping medium for the same amount of hydrocarbon vapors as stripped off by a stripper having less stages.

Figure 2:
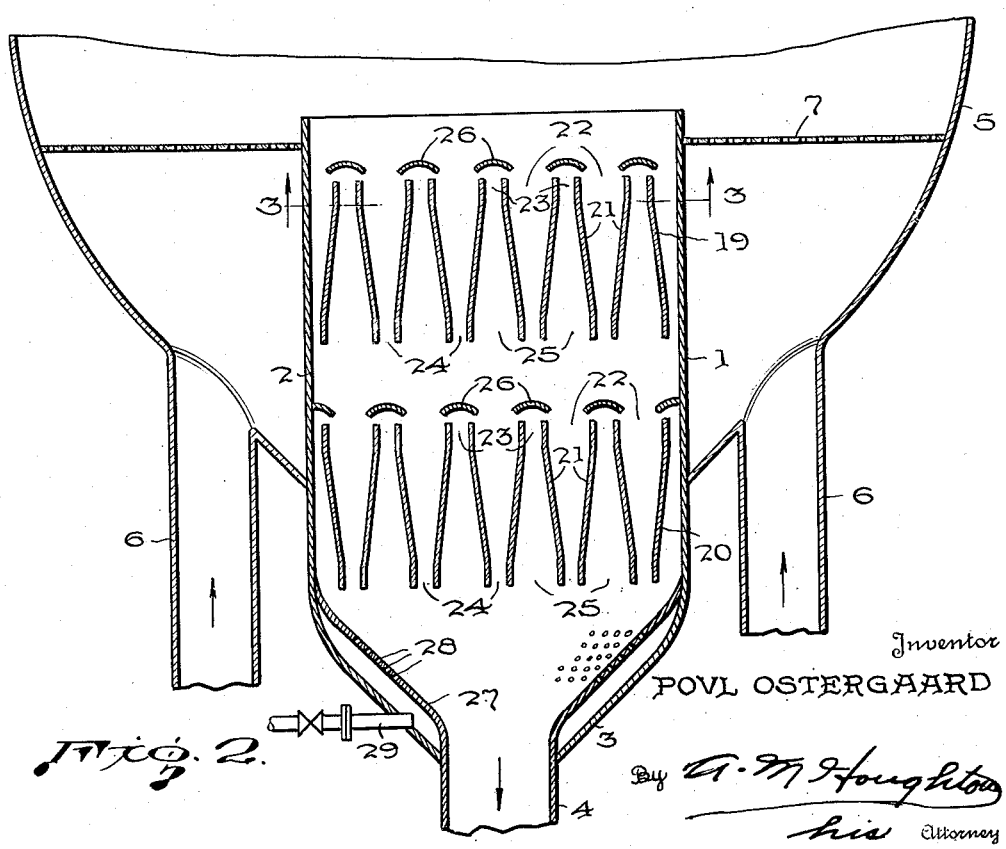
Figure 2 is a vertical section of a stripper showing another embodiment of the invention.

In the embodiment of the invention shown in Figure 2, the numeral 1 represents the stripper generally, 2 is the shell of the stripper and 3 is the conical base of the stripper with the standpipe 4 passing therethrough. The stripper is installed in the base of reactor 5, having feed lines 6 and a distribution grid 7. These parts are identical with the identically numbered parts of Figure 1 and function in an identical manner. Disposed within the stripper shell 2 are sets of trays 19 and 20 in superposed relationship. Each tray is made up of a series of V-shaped sections 21 spaced in a parallel row to form a series of alternate wide openings 22 and narrow openings 23 at the top of the tray as shown in Figure 3. The V-shaped sections 21 form downflow sections for the catalyst stream through the wide openings 22, and taper down to narrow openings 24 at the outlet of the catalyst stream from the tray. The spaces between the V-shaped sections 21 form wide openings 25 at the bottom of the tray for the ascending stripping medium and stripped off hydrocarbon vapors, and due to the V-shape of the tray sections the vapor passages taper up to narrow outlets or openings 23 at the top of the tray. The sections 21 are staggered in succeeding trays so that the narrow outlets 24 in the bottom of tray 19 are opposite to the narrow openings 23 in the top of tray 20. Over the outlets 23 at the top of the trays are horizontal deflector plates 26, which may be semi-circular in cross-section or any other suitable shape. The deflectors serve the purpose of deflecting the downflowing catalyst stream into the V-shaped sections 21, and also deflect the rising stripping medium and stripped off hydrocarbon vapors over the openings 22 to accomplish thorough mixing with the catalyst stream. At the bottom of the stripper is a funnel shaped baffle 27, having openings or perforations 28 in the upper part thereof. The baffle 27 forms a confined space with conical base 3 of the stripper. A pipe or nozzle 29 opens into the base 3 of the stripper for the purpose of admitting the stripping medium.

The stripper shown in Figure 2 follows the principles of operation of the stripper of Figure 1. Steam or any other inert gaseous stripping medium is admitted through the nozzle 29 and passes from the confined space between the baffle 27 and the base 3 through the perforations 28 into the lower section of the stripper. The catalyst stream enters the top of the stripper 1, is contacted with a mixture of steam and stripped-off hydrocarbon vapors rising from the succeeding tray through the openings 25 and 23 and deflected into the catalyst stream by the deflectors 26, whereby the catalyst stream is thoroughly mixed with stripping medium and lowered in density. Stripped-off hydrocarbon vapors pass upwardly into the reactor 5 and the catalyst particles settle into the V-shaped sections 21. Passage of the catalyst stream down through the V-shaped sections 21 increases the density thereof to approximately 25 pounds per cubic foot and results in squeezing out a further portion of the entrained hydrocarbon vapors which pass upwardly to the reactor. The catalyst stream at the increased density passes down into the space between trays 19 and 20 where it is contacted by a mixture of steam and hydrocarbon vapors rising through the openings 25 and 23 in tray 20 and deflected into the catalyst stream by the deflectors 26. The density of the catalyst stream is thus decreased to approximately 15 pounds per cubic foot, and the action described for tray 19 is repeated. The action of any additional trays will be similar to the action of the first tray, and as many separate trays can be installed as is desired. The catalyst stream ultimately passes through the baffle 27 to standpipe 4 and is substantially free of entrained hydrocarbons.

Another embodiment of this invention is represented in Figure 4, where an annular type stripper is shown. In this embodiment, the shell 2 of the stripper is mounted within the lower part of a reactor 5, and the stripping action takes place in the annular space between the shell of the stripper and the reactor. The reactor 5 has a conical base 3 joined to the standpipe 4. A feed line 6 passes through the base 3 of the reactor and is joined to a distributing cone 30 mounted within shell 2 of the stripper. This distributing cone has a perforated distributing screen or grid 7, through which the reactant hydrocarbons with the catalyst suspended therein pass upward into the reactor. Within the annular space between the shell 2 of the stripper and the reactor are disposed a series of truncated conical baffles, 31, 32 and 33, concentric with the shell 2, and spaced in alternate inverse relationship with respect to each other. The ends of the baffles do not contact either the shell 2 or the wall of the reactor 5 except for support stubs. The lower end of each baffle 31, 32 and 33 is integrally joined to a short cylindrical vertical shell, 35, 36 and 37, also concentric with the shell 2, and forming narrow passages 38, 39 and 40 alternately with the shell 2 and the wall of reactor 5. Above the upper ends of each of the baffles 31, 32 and 33 is another series of truncated conical baffles 41, 42 and 43, concentric with shell 2, and joined at their upper ends alternately to the wall of the reactor 5 and to the shell 2, as the case may be. The baffles 41, 42 and 43 are spaced parallel from the next succeeding baffles 31, 32 and 33, respectively, and form narrow openings 44, 45 and 46 therewith. Manifold 47 connects with multiple openings into the annular space below the last baffle 33 for the purpose of admitting stripping medium into the stripper.

The operation of the stripper of Figure 4 is substantially similar to that of Figure 1. The hydrocarbon reactant together with catalyst suspended therein flows upwardly into the reactor through feed line 6, distributing cone 30, and distribution plate 7. Spent catalyst together with commingled hydrocarbon vapors is withdrawn from the reactor and passes downwardly into the annular space between the shell 2 and the wall of the reactor. Steam or other stripping medium is admitted from manifold 47 to the space below baffle 33 and passes upwardly through the opening 46. The catalyst stream passing downwardly over baffle 41 is contacted with a mixture of steam and stripped-off hydrocarbon vapors passing upwardly through opening 44 from the succeeding stage and is thereby thoroughly mixed therewith and decreased in density. Stripped off hydrocarbon vapors pass upwardly into the reactor. The catalyst particles settle down into the space between the baffle 31 and the shell 2 and become heavier in density because of the increasing constriction of the passage. Upon passing through the narrow passage 38, the catalyst stream has increased in density to about 25 pounds per cubic foot, and a further portion of the entrained hydrocarbon vapors has been squeezed out because of the increase in density. The stripped-off vapors pass upwardly into the reactor, and the catalyst stream flows from the narrow passage 38 over baffle 42. As the catalyst stream flows down over the opening 45, it is contacted by a mixture of stripping steam and stripped-off hydrocarbon vapors flowing through the opening 45 from the succeeding stage. The catalyst stream is thereby thoroughly mixed with the stripping medium and its density is decreased to approximately 15 pounds per cubic foot. Stripped-off hydrocarbon vapors and stripping steam pass upwardly through opening 44, and the catalyst settles into the space between the baffle 32 and the wall of the reactor 5, where it undergoes another increase in density. The above described action is repeated in the next stage, the catalyst stream being contacted with a stream of pure stripping medium from the opening 46, whereby it is decreased in density; and then undergoes another increase in density as it passes down through the space between the baffle 33 and the shell 2. A stream of catalyst substantially free of entrained hydrocarbons is discharged from the narrow passage 40 into the base 3 of the reactor and passes therefrom into the standpipe 4. In this modification also, as many additional stripping stages may be employed as is desirable.

Figure 5:
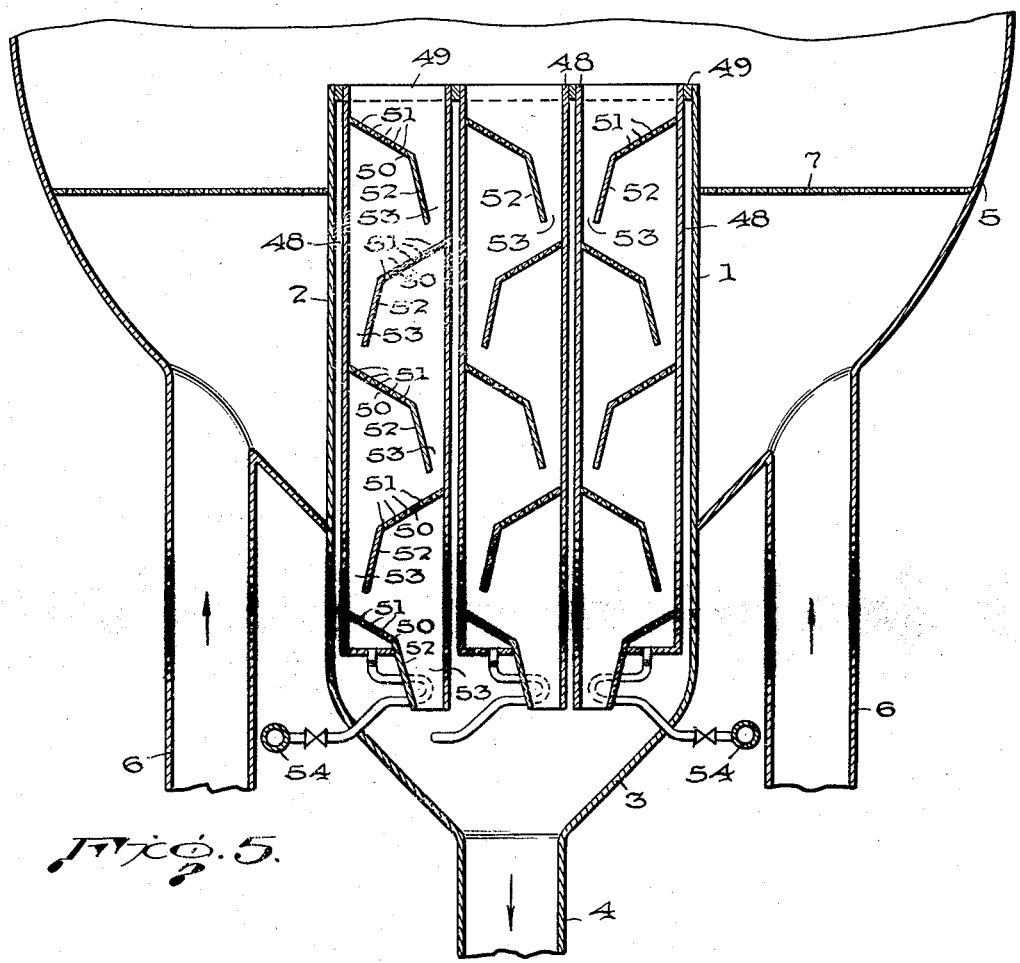
Figure 6:
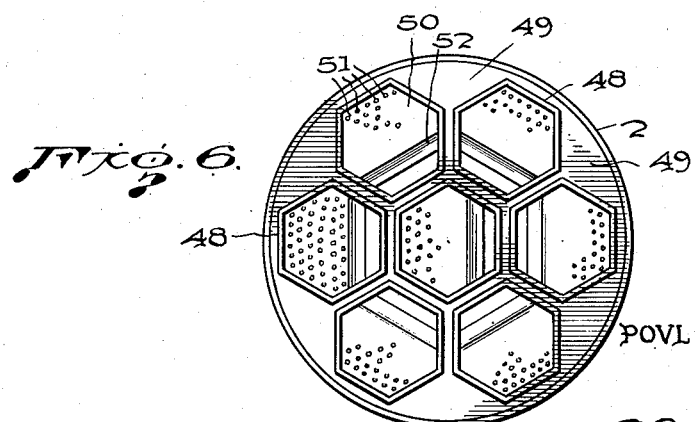
Figure 6 is a plan view of the stripper of Figure 5.

In another embodiment of the invention as shown in Figure 5, the numeral 1 represents the stripper generally, 2 is the shell of the stripper and 3 is the conical base of the stripper which is joined to standpipe 4. The stripper is installed in the base of reactor 5, having feed lines 6 and a distribution grid 7. These parts are identical with the identically numbered parts of Figure 1 and function in an identical manner. Within the stripper shell 2 are a number of smaller shells or cartridges 48, suspended from tube sheet 49, and retained in position by such guiding members (not shown) as may be required. Each cartridge 48 contains a series of baffle plates 50, the upper ends of which are joined alternately to opposite walls of the cartridge. The baffle plates 50 contain openings or perforations 51 for the passage of stripping medium and vapors. The baffle plates 50 are inclined downwardly at a suitable angle from the horizontal, but ordinarily not in excess of 45°. At their lower ends, the baffles 50 are integrally joined to solid baffle plates 52 which incline downwardly at a suitable angle from the horizontal ordinarily in excess of 45° but not in excess of 90°. The lower ends of baffle plates 52 do not contact the walls of the cartridge 48, but form narrow tapering passages 53 therewith. Manifold 54 connects with lines opening into the confined space between the bottom baffle and the wall of the cartridge for the purpose of admitting stripping medium to the stripper.

The operation of this type of stripper is substantially similar to those previously described. Steam or other inert stripping medium is introduced from the manifold 54 into the confined space between the bottom baffle and the wall of the cartridge and rises into the stripper through the openings 51 in the baffles 50. The stream of spent catalyst, commingled with entrained hydrocarbon vapors enters the top of the stripper. Through mixing of the catalyst stream with the stripping medium and decreases in density are accomplished when the catalyst stream passes over the openings 51 in the baffles 50. Increases in density and squeezing out of entrained hydrocarbon vapors are accomplished when the catalyst stream passes through the narrow tapering passages 53. Stripped off hydrocarbon vapors pass upwardly into the reactor, and the catalyst stream substantially free from entrained hydrocarbon vapors is discharged into the standpipe 4. While five stripping stages have been indicated in each cartridge, more or less stages may be used as required for the particular stripping job. The type of stripper disclosed in Figure 5 has the additional advantage of subdividing the catalyst stream in a plurality of smaller separate streams, so that still more efficient contact with the stripping medium may be accomplished.

In general, when using a three stage stripping operation in accordance with this invention, there is left in the stream of spent catalyst emerging from the stripper only from 1 to 5 per cent entrained hydrocarbon vapors by volume of the total entrained gases. This corresponds to a hydrocarbon content of from 0.05 to 0.25 per cent by weight on the charge to the reactor. When these amounts are contrasted with the amounts of 2 to 4 per cent by weight on the charge resulting from typical present commercial stripping, the remarkable increase in stripping efficiency attained by this invention becomes readily apparent. The above described results of this invention are obtained by using three stage stripping and an amount of stripping steam equivalent to about 4.8 pounds per 1000 pounds of catalyst. If still greater efficiency is desired, more stripping stages may be added or a greater amount of stripping steam may be used.

Furthermore, this invention achieves a greater stripping efficiency for a given amount of stripping medium than can be obtained by the known types of stripping units. In addition, in the known types of stripping units, increase in the amount of stripping medium reaches a limiting point in stripping efficiency beyond which the efficiency actually decreases; whereas, in the present invention stripping efficiency is increased by increasing the amount of stripping medium. These results are shown in the following table, using steam as the stripping medium.

| Lbs. of Steam Per 1000 Lbs. of Catalyst | Mol Percent Hydrocarbon Vapors in Entrained Gases Leaving Stripper | | |
|---|---|---|---|
| | Known Stripper | 5-Stage Stripper | 7-Stage Stripper |
| 1.0 | 53.0 | 44.0 | 30.0 |
| 2.0 | 35.0 | 14.0 | 9.0 |
| 2.5 | 33.0 | 7.5 | 4.0 |
| 3.3 | 47.0 | 3.5 | 0.0 |
| 3.8 | 57.0 | 2.0 | 0.0 |

The table also shows (1) the advantage of increasing the number of stages for a given amount of steam and (2) the smaller amount of stripping medium required for a larger number of stages.

The following is illustrative of a typical operation of the stripper of Figure 1. In a fluid catalytic cracking unit employing a total feed of 233,050 pounds of oil per hour, a catalyst circulation of 3,012,000 pounds per hour, a reactor temperature of about 975° F., a density in the reactor of about 15 pounds per cubic foot and an amount of stripping steam of about 4.8 pounds per 1000 pounds of catalyst at about a pressure of 30 pounds per square inch gauge, the catalyst stream entering the stripper of Figure 1 has a density of about 15 pounds per cubic foot and the vapors entrained in the catalyst stream contain approximately 68 per cent by volume of hydrocarbon vapors, the remainder being stripping steam and other inert gases. After the catalyst stream passes from the first stage, that is, through throat 10, the catalyst entrained hydrocarbon vapors are reduced to about 30 per cent by volume. After passing from the second stage, that is, through annular space 14, the catalyst entrained hydrocarbon vapors are reduced to about 8 per cent by volume. Finally, after passage through the third stage, that is, through throat 11, the catalyst entrained hydrocarbon vapors are reduced to approximately 1.5 per cent by volume, corresponding to about 0.075 per cent by weight on the charge.

Although, in the preceding description, the densities of the stream of fluidized solids have been described as approximately 15 and 25 pounds per cubic foot, it should be understood that this invention is not limited to these specific densities. As is known in the art, the density will depend on the amount of vapor charged, the amount of solids charged, the sizes of the solid particles and the velocity of the carrier stream in any particular unit of fixed dimensions. Variation of these factors will vary the density of the stream of fluidized solids and may be made without departing from the spirit of this invention. The differential increase in density may be more or less than 10 pounds per cubic foot, but should be sufficiently great to accomplish the desired squeezing out of entrained or adsorbed vapors without necessitating the use of an uneconomical number of stripping stages. When repeating the alternate density changes, it is preferred to decrease the density and then increase it; however, this procedure may be reversed and the density may first be increased, for example by omitting contact of the stream of fluidized solids with stripping medium as the stream enters the stripper and by-passing the stripped-off vapors and stripping medium from the succeeding stage.

Where steam is used as the stripping medium, the amount thereof may vary between 1 and 6 pounds per 1000 pounds of fluidized solids circulated. The amount of stripping medium used will depend on the number of stripping stages in the stripping zone and the degree of stripping required. As previously stated, an increase of the number of stages decreases the amount of stripping medium required for a given degree of stripping; and an increase in the amount of stripping medium will increase the degree of stripping. Where steam is used in a three stage stripper, it is preferred to use between about 4 and 5 pounds per 1000 pounds of fluidized solids circulated. In those cases where steam, as the stripping medium, slowly deactivates the catalyst, other inert gases such as nitrogen, carbon dioxide, combustion gases or the like may be used as the stripping medium.

While my invention has been described with particular reference to hydrocarbon conversion processes, it should be understood that it is not so limited. In addition to its general applicability to catalytic conversion processes employing fluidized solid catalysts, the stripping process and apparatus of this invention are applicable to the stripping of fluidized solid adsorbents. Thus where a solid adsorbent capable of being fluidized is used for adsorption of vapors, as, for example, the selective adsorption of ethylene from refinery gases, the stripping process and apparatus of this invention may advantageously be applied efficiently to remove adsorbed vapors from the fluidized solid adsorbent.

Where reference is made herein to entrained vapors or gases, it is intended to include vapors or gases adsorbed on the fluidized solid. The term "entrained" is used broadly to cover any manner by which the vapors or gases are held or carried by the fluidized solid.

What I claim is:

1. The process of stripping entrained vapors from finely divided solids maintained in fluidized condition which comprises passing a stream of said fluidized solids commingled with entrained vapors through a stripping zone in a path following a substantially continuous downward progression, simultaneously passing a stream of inert gaseous stripping medium through said stripping zone in a different path following a substantially continuous upward progression, intermittently and at least twice intersecting the two paths while said stream of fluidized solids is at a density substantially higher than that existing immediately after intersection of the two paths, passing the downflowing stream of fluidized solids through a downwardly inclined constricted passage of gradually diminishing cross section to the substantial exclusion of the upwardly progressing gaseous stripping medium after each intersection of the two paths, and withdrawing from the bottom of the stripping zone a stream of fluidized solids substantially free from entrained vapors.

2. In a hydrocarbon conversion process wherein hydrocarbon vapors are brought into contact with a finely divided solid catalyst maintained in fluidized condition in a reaction zone, the steps which comprise withdrawing from the reaction zone a stream of spent fluidized catalyst commingled with entrained hydrocarbon vapors, passing said catalyst stream in a substantially downward direction into a stripping zone, contacting said catalyst stream therein with an inert gaseous stripping medium rising countercurrently thereto whereby the catalyst stream density is decreased, then passing said catalyst stream through a downwardly inclined constricted passage of gradually diminishing cross section to the substantial exclusion of said rising gaseous stripping medium whereby the catalyst stream density is increased, continuing to pass said catalyst stream in a substantially downward direction through said stripping zone while alternately contacting it with said rising gaseous stripping medium and passing it through a downwardly inclined constricted passage of gradually diminishing cross section in the manner aforesaid until the amount of hydrocarbon vapors has been substantially reduced, and withdrawing a stream of stripped spent catalyst from the stripping zone.

3. In a hydrocarbon conversion process wherein hydrocarbon vapors are brought into contact with a finely divided solid catalyst maintained in fluidized condition in a reaction zone, the steps which comprise withdrawing from the reaction zone a stream of spent fluidized catalyst commingled with entrained hydrocarbon vapors, passing said catalyst stream in a substantially downward direction into a stripping zone, contacting said catalyst stream therein with an inert gaseous stripping medium rising counter-currently thereto whereby the catalyst stream density is decreased, then passing said catalyst stream through a downwardly inclined constricted passage of gradually diminishing cross section to the substantial exclusion of said rising gaseous stripping medium whereby the catalyst stream density is substantially increased, passing said catalyst stream while at such increased density downwardly through said stripping zone and again contacting said catalyst stream with an inert gaseous stripping medium rising countercurrently thereto whereby the catalyst stream density is again decreased, again passing said catalyst stream through a downwardly inclined constricted passage of gradually diminishing cross section to the substantial exclusion of said rising gaseous stripping medium whereby its density is again increased, continuing the alternate contact of said catalyst stream with stripping medium during its downward progression through said stripping zone while at its increased density and the passage of catalyst stream of decreased density through downwardly constricted passages of gradually diminishing cross section as aforesaid until the amount of commingled hydrocarbons has been substantially reduced, and withdrawing a stream of stripped spent catalyst from the stripping zone.

4. Apparatus for removing entrained vapors from a fluidized finely divided solid, comprising a shell forming a confined space, means for introducing a stream of said fluidized solid into the top of said shell, means for introducing an inert gaseous stripping medium into the bottom of said shell, baffles disposed within said confined space and forming zones of intermittent intersection of said stream of fluidized solid with said stripping medium without substantially retarding downward progression of said fluidized solid, a downwardly inclined constricted passage of gradually diminishing cross section succeeding each of the aforesaid zones, and means for withdrawing a stream of stripped fluidized solid from the bottom of said shell.

5. Apparatus for removing entrained vapors from a fluidized finely divided solid, comprising a cylindrical shell, means for introducing a stream of said fluidized solid into the top of said shell, means for introducing a gaseous stripping medium into the bottom of said shell, a plurality of baffles mounted in said shell and forming alternate downwardly inclined constricted passages of gradually diminishing cross section and wide passages disposed to permit substantially continuous downward progression of said fluidized solid, said baffles being so constructed and arranged with respect to each other and to said shell as to form at least one narrow opening distinct from said downwardly inclined constricted passages and discharging into said wide passages, and means for withdrawing a stream of stripped fluidized solid from the bottom of said shell.

6. Apparatus for removing entrained hydrocarbon vapors from a fluidized solid catalyst adapted for use in hydrocarbon conversions comprising: a cylindrical shell; means for introducing a stream of said catalyst into the top of said shell; means for introducing an inert gaseous stripping medium into the bottom of said shell; a plurality of funnel-shaped baffles joined to said shell at their upper ends and having relatively narrow throats extending downwardly; a conical baffle intermediate two of said funnel-shaped baffles, the apex of said conical baffle extending upwardly and spaced opposite to the relatively narrow throat of the funnel-shaped baffle next above said conical baffle, the base of said conical baffle forming a relatively narrow annular space with said shell; each of the aforesaid baffles having perforations in the upper portion thereof; and means for withdrawing a stream of stripped catalyst from the bottom of said shell.

7. Apparatus for removing entrained hydrocarbon vapors from a fluidized solid catalyst adapted for use in hydrocarbon conversions comprising: a cylindrical shell; means for introducing a stream of said catalyst into the top of said shell; means for introducing an inert gaseous stripping medium into the bottom of said shell; a plurality of trays mounted in said shell and spaced in superimposed relationship; each tray comprising a parallel row of V-shaped sections open at the bottom and forming a series of alternate relatively wide and narrow openings at the top of the tray and a converse series of relatively narrow and wide openings at the bottom of the tray; the V-shaped sections in succeeding trays being so spaced with respect to those of the tray next above as to oppose the narrow openings in the bottom of the tray next above to the narrow openings in the top of the succeeding tray; a deflector over each narrow opening in the top of each tray; and means for withdrawing a stream of stripped catalyst from the bottom of said shell.

8. Apparatus for removing entrained hydrocarbon vapors from a fluidized solid catalyst adapted for use in hydrocarbon conversions comprising: a pair of concentric cylindrical shells forming an annular space therebetween; means for introducing a stream of said catalyst into the top of said annular space; means for introducing an inert gaseous stripping medium into the bottom of said annular space; a plurality of truncated conical baffles disposed within said annular space concentric with said shells, in alternate inverse relationship to each other, and forming relatively narrow annular spaces alternately with the outer shell and inner shell at the ends of said baffles; relatively short cylindrical shells concentric with the aforesaid shells and joined to the lower end of each of said baffles; a plurality of other truncated conical baffles concentric with the aforesaid shells, joined alternately to the outer shell and inner shell above and parallel to the next succeeding first-mentioned conical baffle; and means for withdrawing a stream of stripped catalyst from the bottom of said annular space.

9. Apparatus for removing entrained hydrocarbon vapors from a fluidized solid catalyst adapted for use in hydrocarbon conversions comprising: a relatively large cylindrical shell; means for introducing a stream of said catalyst into the top of said shell; means for introducing an inert gaseous stripping medium into the bottom of said shell; a plurality of smaller shells disposed within said shell; a plurality of downwardly inclined baffle plates having perforations therein joined alternately to opposite walls of each of said smaller shells at the upper ends of said baffle plates; a plurality of other baffle plates joined at their upper ends to the lower ends of the first-mentioned baffle plates and forming a series of relatively narrow tapering passages within the walls of each of said smaller shells; and means for withdrawing a stream of stripped catalyst from the bottom of said relatively large shell.

POVL OSTERGAARD.

REFERENCES CITED

The following references are of record in the file of this patent:

UNITED STATES PATENTS

| Number | Name | Date |
|---|---|---|
| 2,367,694 | Snuggs | Jan. 23, 1945 |
| 2,412,696 | Schonberg et al. | Dec. 17, 1946 |
| 2,415,756 | Le Roi et al. | Feb. 11, 1947 |
| 2,422,262 | Russell | June 17, 1947 |

Certificate of Correction

Patent No. 2,519,150 — August 15, 1950

POVL OSTERGAARD

It is hereby certified that error appears in the printed specification of the above numbered patent requiring correction as follows:

Column 4, lines 38 and 39, for "resulats" read *results*; column 10, line 28, for the word "Through" read *Thorough*; column 16, lines 2 and 3, for "within" read *with*; and that the said Letters Patent should be read as corrected above, so that the same may conform to the record of the case in the Patent Office.

Signed and sealed this 7th day of November, A. D. 1950.

[SEAL]

THOMAS F. MURPHY,
*Assistant Commissioner of Patents.*